(12) United States Patent
Myr (10) Patent No.: US 10,410,532 B1
(45) Date of Patent: Sep. 10, 2019

(54) AUTOMATIC REAL-TIME SYSTEM AND METHOD FOR CENTRALIZED AIR TRAFFIC CONTROL OF AERIAL VEHICLES IN URBAN ENVIRONMENT

(71) Applicant: Makor Issues and Rights Ltd., Jerusalem (IL)

(72) Inventor: David Myr, Jerusalem (IL)

(73) Assignee: MAKOR ISSUES and RiGHTS LTD., Jerusalem (IL)

( * ) Notice: Subject to any disclaimer, the term of this patent is extended or adjusted under 35 U.S.C. 154(b) by 0 days.

(21) Appl. No.: 16/010,470

(22) Filed: Jun. 17, 2018

(51) Int. Cl.
| | |
|---|---|
| *G01C 21/34* | (2006.01) |
| *G06F 17/50* | (2006.01) |
| *G08G 5/04* | (2006.01) |
| *G08G 5/00* | (2006.01) |
| *G08G 5/06* | (2006.01) |
| *B64C 39/02* | (2006.01) |

(52) U.S. Cl.
CPC .......... *G08G 5/045* (2013.01); *G08G 5/0013* (2013.01); *G08G 5/0034* (2013.01); *G08G 5/0039* (2013.01); *G08G 5/0043* (2013.01); *G08G 5/0065* (2013.01); *G08G 5/0069* (2013.01); *G08G 5/065* (2013.01); *B64C 39/024* (2013.01); *B64C 2201/146* (2013.01)

(58) Field of Classification Search
CPC .......... G08G 5/045; G01C 21/34; G06F 17/50
See application file for complete search history.

(56) References Cited

U.S. PATENT DOCUMENTS

2008/0221843 A1* 9/2008 Shenkar .................. G06T 17/05
703/1
2018/0045522 A1* 2/2018 Aziz .................. G01C 21/3407

* cited by examiner

*Primary Examiner* — Yuri Kan (57) ABSTRACT

The invention discloses a centralized city-wide automatic real-time system and method for air traffic control of aerial vehicles (both manned and unmanned) in urban environment, wherein each air traffic control object includes a GPS/ADS-B equipment, transmitter and receiver for bi-directional communications with the central processing server unit.

The aerial vehicles will be centrally controlled in the entire city in such a way that they will fly directly above existing paved roads in the city, through predetermined vertical altitude levels.

By moving above the existing roads, the number of potential conflicts will be decreased. Major conflict zones could be defined at road intersections and areas surrounding road intersections.

10 Claims, 8 Drawing Sheets

General System Overview

Fig. 1 General System Overview

Fig 2 Databases

Fig 3
Aerial Vehicles Database

Fig. 5
Schematic Overview

Fig 6
Centrally Controlling the Aerial Vehicles precedents

AUTOMATIC REAL-TIME SYSTEM AND METHOD FOR CENTRALIZED AIR TRAFFIC CONTROL OF AERIAL VEHICLES IN URBAN ENVIRONMENT

FIELD OF THE INVENTION

This present invention generally relates to autonomous aerial vehicle navigation, and, more specifically, to systems, methods, and devices for automated air traffic control and flight plan management system aerial vehicles in an urban environment.

REFERENCES

US Patent Documents

LeMire U.S. Pat. No. 8,378,881
Duggan U.S. Pat. No. 8,380,425
Klinger U.S. Pat. No. 8,874,360
Raptopoulos U.S. Pat. No. 9,384,668
Duffy U.S. Pat. No. 9,495,877
Gentry U.S. Pat. No. 9,858,822
Kunzi U.S. Pat. No. 9,875,661
Paduano U.S. Pat. No. 9,958,875
Butler US 20170263132
Schultz US 20180068187
Gohl US 20180101782
Ceccherelli US 20180122249

Articles

Amazon Company "Revising the Airspace Model for the Safe Integration of Small Unmanned Aircraft Systems"

BACKGROUND AND THE STATE OF THE ART

Aerial vehicles and Unmanned Aerial Vehicle ("UAV") technology has proven to be a very useful tool for military purposes, goods and payload delivery. Still, there is a lack of aerial vehicles and UAVs management systems, particularly in an urban environment. Meanwhile, safety and regulatory measures for aerial vehicles/UAVs will be detailed in the coming years to facilitate safe flights in an urban environment.

Currently, FAA regulations require UAVs to fly only during daylight or civil twilight, at or below 400 feet. And don't fly in controlled airspace near airports without FAA permission (around 5 miles).

Modern aerial vehicles have on-board GPS/ADS-b equipment, sensors collision avoidance systems, but the ever growing number of these vehicles must be centrally controlled in congested urban airspace.

In March 2018, the FAA announced that it was expanding beta testing of its automated Low Altitude Authorization and Notification Capability (LAANC), to 300 air traffic facilities covering 500 airports beginning April 30. Drone/UAS operators using LAANC can receive near real-time airspace authorizations, thus decreasing waits compared to manual authorizations, which can take days. The automated system also allows air traffic controllers to see where planned drone operations will take place.

U.S. Pat. No. 8,380,425 by Duggan titled: "Autonomous collision avoidance system for unmanned aerial vehicles" presents a system that senses a potential object of collision and generates a moving object track for the potential object of collision. The auto avoidance module utilizes the information to generate a guidance maneuver that facilitates the unmanned aerial vehicle avoiding the potential object of collision.

Another example of a collision-avoidance system is presented in U.S. Pat. No. 9,875,661 by Kunzi titled: "Dynamic collision-avoidance system and method". Kunzi discloses an obstacle-avoidance system for aerial vehicles comprising a plurality of sensors configured to detect collision threats within a predetermined distance of the vehicle and a processor. Using the obstruction data, the processor identifies a direction for avoiding said obstruction.

U.S. Pat. No. 8,378,881 by LeMire titled: "Systems and methods for collision avoidance in unmanned aerial vehicles" relates to a method for collision avoidance system for an unmanned aerial vehicle (UAV), including scanning for objects using a plurality of phased array radar sensors, wherein the scan information includes information indicative of objects detected within the preselected range of the UAV, determining maneuver information including whether to change a flight path of the UAV based on the scan information, and sending the maneuver information to a flight control circuitry of the UAV.

US 20180101782 by Gohl titled: "Systems and methods for determining predicted risk for a flight path of an unmanned aerial vehicle" provides an invention for determining predicted risk for a flight path of an unmanned aerial vehicle, wherein the 3D representation reflects a presence of objects and object existence accuracies for the individual objects. A user-created flight path may be obtained for a future unmanned aerial flight within the three-dimensional representation of the user-selected location. Predicted risk may be determined for individual portions of the user-created flight path based upon the three-dimensional representation of the user-selected location.

Ceccherelli in his US 20180122249 titled: "Collision avoidance systems" presents a system where the UAV includes a low power RF beacon which transmits signals over a predefined frequency monitored by manned aerial vehicles.

Schultz in US 20180068187 titles: "Unmanned aircraft obstacle avoidance" discloses a collision detection and avoidance system configured to: receive a flight path with instructions for the UAV and execute a target path for traveling around the obstacle.

There are a number of prior art patents and patent applications disclosing aerial vehicles navigation systems. None of them presents a system presents a specific invention for centralized aerial vehicles control in an urban aerospace with all its specifics and characteristics, while minimizing a total of aerial vehicles maneuvers, and especially with flying above an existing roads system.

One example of such patent is in U.S. Pat. No. 8,874,360 by Klinger titled: "Autonomous vehicle and method for coordinating the paths of multiple autonomous vehicles". Klinger presents an invention where after the first planned path associated with the second vehicle is received, a second planned path is generated based on the first planned path associated with the second vehicle and at least one of the mission requirement assigned to the first vehicle or the first planned path of the first vehicle. The second planned path of the first vehicle is then transmitted to the second vehicle.

Paduano in his U.S. Pat. No. 9,958,875 titled: "Autonomous cargo delivery system" presents an autonomous aerial system for delivering a payload to a waypoint. In Paduano, the system may be configured to autonomously navigate the aerial vehicle to the waypoint and to determine whether to touchdown at the designated touchdown zone based at least in part on physical characteristics of the designated touchdown zone perceived via said sensor package.

U.S. Pat. No. 9,384,668 "Transportation using network of unmanned aerial vehicles" by Raptopoulos provides an UAV delivery system wherein a plurality of ground stations configured to communicate with UAVs and provide location information other UAVs to locate a ground station location. In certain embodiments, the delivery vehicles autonomously navigate from one ground station to another, in other embodiments, the ground stations provide navigational aids that help the delivery vehicles locate the position of the ground station with increased accuracy.

Duffy U.S. Pat. No. 9,495,877 in "Airspace deconfliction system and method" presents an aircraft deconfliction system, wherein an override unit takes remedial action when said aircraft breaches said threshold.

Gentry in his U.S. Pat. No. 9,858,822 "Airspace activity tracking using unmanned aerial vehicles" discloses the system wherein UAVs on the mesh network utilize local and central mesh database information for self-identification and to maintain a dynamic flight plan. The system also presents a flight management system that collects UAVs location information and transmitting to other UAVs a notification that includes at data that tracks aircraft in the airspace. U.S. Pat. No. 9,646,502 by Gentry discloses a similar system.

US 20170263132 "Aerial vehicle air traffic control and flight plan management" by Butler presents a method of air traffic control for drones wherein each drone flight plan comprises a sequence of 4D cells, attempting to place an exclusive lock on behalf of the drone on the 4D cell, and in response to a failure to place the exclusive lock on behalf of the drone on the 4D cell, rerouting the modified flight plan to a random neighboring 4D cell.

Amazon Company in article "Revising the Airspace Model for the Safe Integration of Small Unmanned Aircraft Systems" (https://www.documentcloud.org/documents/2182311-amazon-revising-the-airspace-model-for-the-safe.html) proposes a plan to reserve airspace between 200 feet and 400 feet above the ground exclusively for fully autonomous drones. This airspace would be open only to pilotless aircraft that are self-operating and equipped with navigation and communication systems, as well as collision avoidance technology.

Voom and Uber companies started to provide helicopter air taxi services in Sao Paulo, Brazil in 2017. Helicopter-based air taxis fly from Sao Paolo airport to a number of landing rooftop locations in downtown.

Several other air taxi providers intend to start their operations in Sao Paolo, Mexico City, Dubai and New York.

When the number of air taxis will increase, there will be a strong need in air traffic control in the urban environment. Therefore centralized air traffic control system for safely and centrally controlling urban aerial vehicles environment is necessary.

DETAILED DESCRIPTION OF THE INVENTION

In the following discussion, numerous specific details are set forth to provide a thorough understanding of the present invention.

Other features and advantages of the present invention will be apparent from the following description taken in conjunction with the accompanying drawings, in which like reference characters designate the same or similar parts throughout the figures thereof.

The ultimate goal of the invented system is to establish a centralized city-wide aerial vehicles air traffic control and management system in an urban airspace area traffic control zone.

The aerial vehicles will be controlled in the entire city in such a way that they will move above existing paved roads in the city, through predetermined vertical altitude levels.

By moving above the existing roads, we decrease the number of potential conflict zones between two aerial vehicles. Major conflict zones could be defined at road intersections and areas surrounding road intersections. Additionally, if two vehicles fly on the same route one behind another, conflict may happen when the second aerial vehicle is flying faster than the first aerial vehicle.

The invention, thus, includes a centralized automatic real-time system and method for air traffic control of aerial vehicles (both manned and unmanned) in urban area traffic control zone, wherein each air traffic control object includes a GPS/ADS-B equipment, transmitter and receiver for bi-directional communications with the central processing server unit. GPS allows for centralized communication wherein the data is transferred via the centralized server processing unit, wherein the
ADS-b allows also each aerial vehicle to see each others location without the centralized server processing unit.

Additionally, the aerial vehicles in the invented system will be equipped with the set of sensors for obstacles/collisions prevention, such sensors presenting a sensor-based obstacle detection and collision prevention unit programmed to identify possible collision threats.

Figure 1:
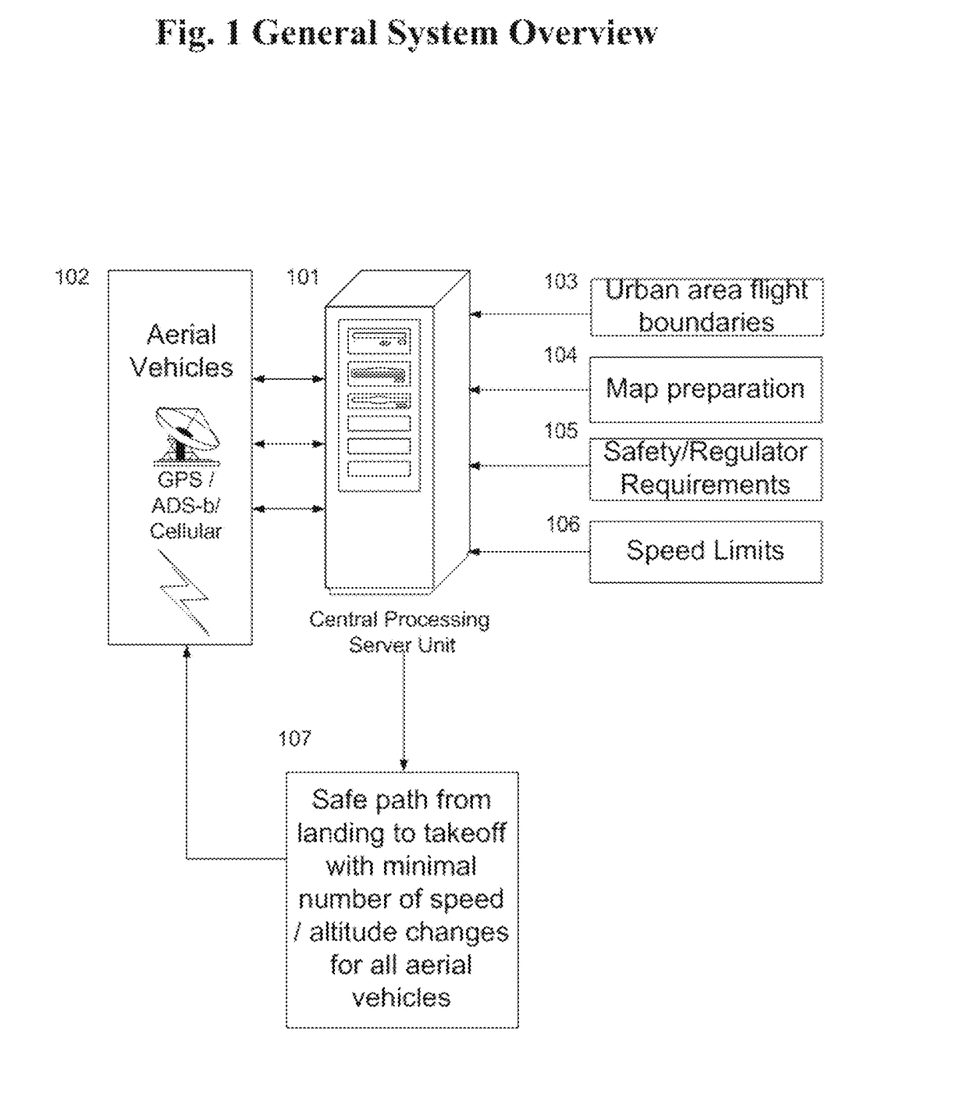
FIG. 1 presents a general overview of the invented system.

The communication between the aerial vehicles 102 and the central processing server unit 101 can be performed using an existing cellular phone network, using point-to-point communications that involve the radio relay or using other communication means. Aerial vehicles location data will be received by GPS/ADS-b means, when every aerial vehicle enrolled into the system must be equipped with GPS and/or ADS-b. In such a communication, each aerial vehicle will have a unique identifier (e.g., a cell phone number) that may be used for communication.

The invention can be implemented either as a completely automated method or a decision-support method supporting human urban aerospace controllers. To facilitate that, means for switching the system mode from automatic system to decision support system, and from decision support system to automatic system will be a part of the invented system.

To implement the system, the urban area air traffic control zone boundaries will be determined 103.

Also, to implement the system, a special map for aerial movement within the urban area air traffic control zone boundaries will be prepared 104. Such a map will include a variety of data necessary to implement correct movement of aerial vehicles within safety rules and other relevant regulations. Such data will include determination of vertical flight levels, direction of movement above each road, entry/exit points, landing/takeoff slots, and available parking zones.

Safety/regulatory requirements will be embedded 105 in the abovementioned map 104 to ensure safe passage within the urban boundaries area. The system is designed in such a way that it can work, under safety standards and regulations (current or as will be determined in the future by FAA or other relevant authority), for a centralized air traffic control system where a number of independent aerial vehicles companies can co-exist in a common urban area traffic control zone airspace.

Speed limits inside such boundaries will be further determined 106. Such speed limits will be defined by $V^{Max}, V^{Min}$.

For each aerial vehicle ride ordered by the user, the output of the system will include safe path from landing to takeoff above existing roads, with minimal total number of changes in speed and/or altitude level for all aerial vehicles currently using the centralized urban area traffic control zone aerospace 107.

The system preferred embodiment is to implement centralized aerial vehicles traffic control but it can be implemented for other uses, such as providing shipments, deliveries, etc. System working parameters can be modified in a real-time mode.

Figure 2:
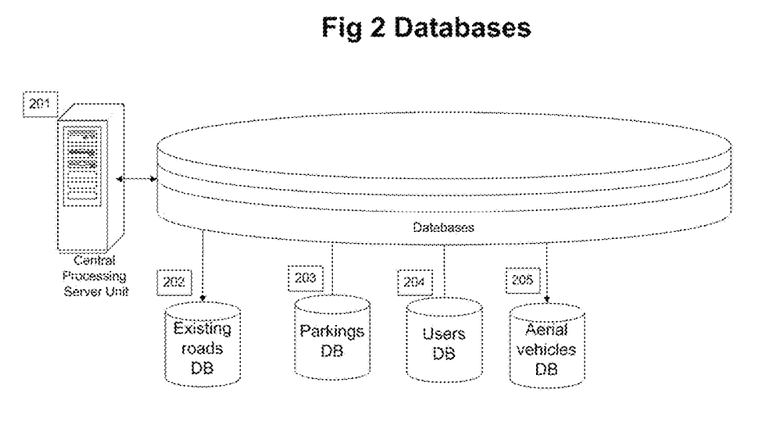
FIG. 2 schematically depicts databases in the invented system.

FIG. 2 graphically depicts databases structure in the invented system.

As mentioned above, the centralized urban air traffic control in our invention is based on flying above the existing paved roads. The database of existing roads 202 in a city urban area traffic control zone will be established on a central processing server unit 201. Regarding each road (street), it will be initially determined if the street is available for aerial vehicles' flying, and the aerial movement direction above the street, as all roads will be set as one-way roads. For streets available for flying, levels open for flying will be further determined.

Each road available for flying will be set as a one-way road for the purpose of flying.

The aerial vehicles will fly above the existing roads in such a way that they will only turn in one direction (i.e., right) on each intersection.

A database of plurality of rooftop/ground-based landing/takeoff locations on which abovementioned aerial vehicles can land and from which can takeoff will be further established 203. The landing/takeoff locations can be on roofs of the existing buildings but also on the ground, near the existing roads.

After the aerial vehicle' landing, if it will not be used immediately for the takeoff from the same location, and if the landing/takeoff location has to be vacated—the said aerial vehicle will descend to the closest public parking. A database of parking lots 204 will be consequently established.

A database of users registered into the system, such users having login/password credentials will be further established 205.

Figure 3:
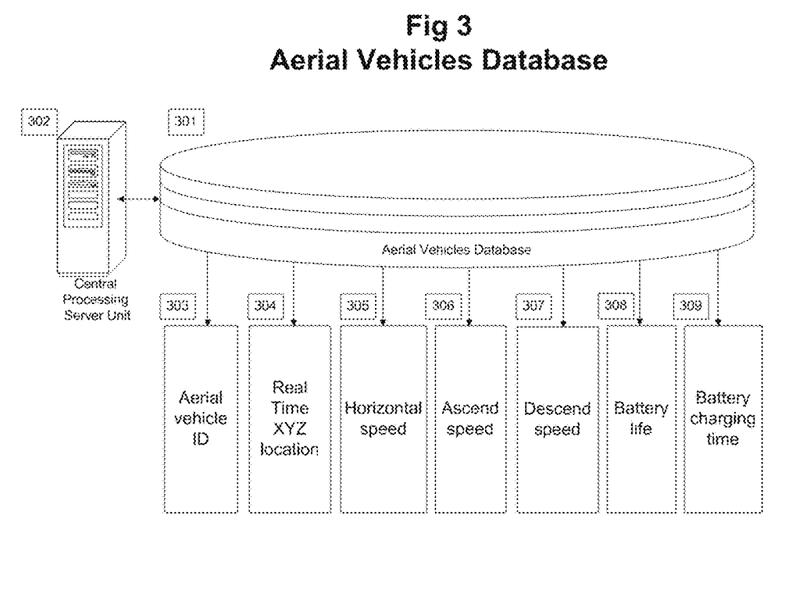
FIG. 3 provides graphical illustration of the aerial vehicles data needed to be obtained and used in the disclosed system.

An aerial vehicle will be allowed to fly in the city airspace must be initially registered in the database of aerial vehicles 206; such database will be further graphically illustrated in FIG. 3. All aerial vehicles allowed to fly in the city airspace will have to pass an airworthiness test first.

The database of aerial vehicles 301 will be further established on a central processing server unit 302; the said database 301 will be interconnected with the said server unit 302. Each aerial vehicle enrolled into the system must have GPS/ADS-b unit mounted on it to obtain an exact aerial vehicle location position on a predetermined time intervals from every company operating the aerial vehicles (if more than one company is operating in a common urban space). In such a database, data for each aerial vehicle will be inputted, such data includes amongst others: aerial vehicle ID 303 (wherein each aerial vehicles will have an Application Programming Interface (API) specific to the aerial vehicle ID), real-time XYZ location 304 obtained through GPS/ADS-b unit mounted on an aerial vehicles, horizontal air speed 305, vertical ascend air speed 306, vertical descent air speed 307, useful battery life time in minutes 308, battery charging time 309. Only aerial vehicles with enough battery life time plus a certain safety interval will be considered as available and will participate in a model' calculation (use in future drawing).

For operating the invented system safely in a low-altitude urban environment, an obstacle-avoidance system may be used, such a system must recognize both large and small obstacles that may be fixed or moving.

Furthermore, such system must be integrated in the general invented system and must interact with a central processing server unit to prevent the collision.

An example of an existing collision-avoidance system is the one developed by Panoptes Company.

For using such a system, all aerial vehicles enrolled into the database must be configured with a plurality of sensors (visual sensors, acoustic sensors, or the like).

The flight itinerary will be initially determined using D* or 3d D* or other routing algorithm D* and its variants have been widely used for mobile robot and autonomous vehicle navigation.

Figure 4A:
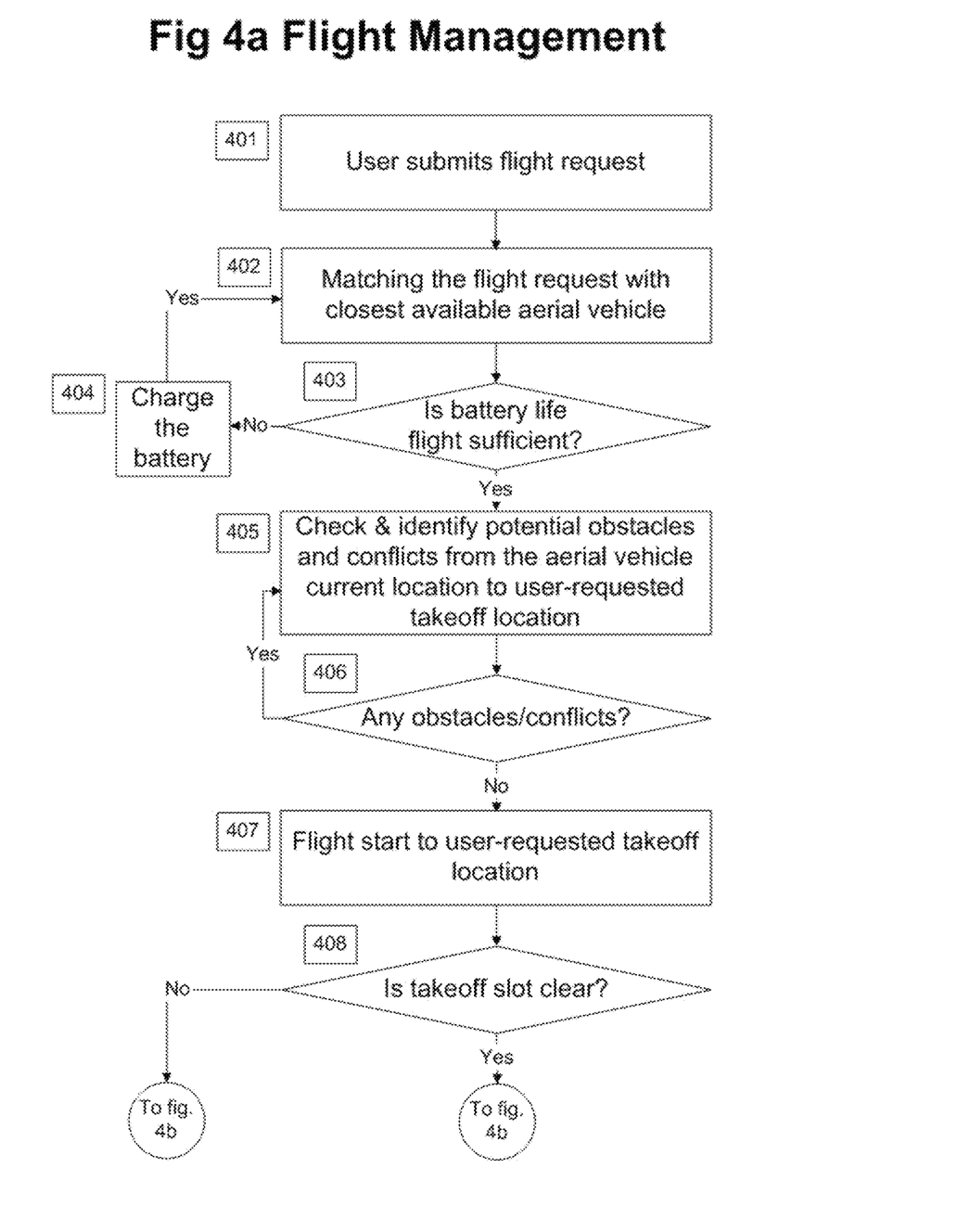
FIG. 4a-4c illustrate aerial vehicle flight management process.
Figure 4B:
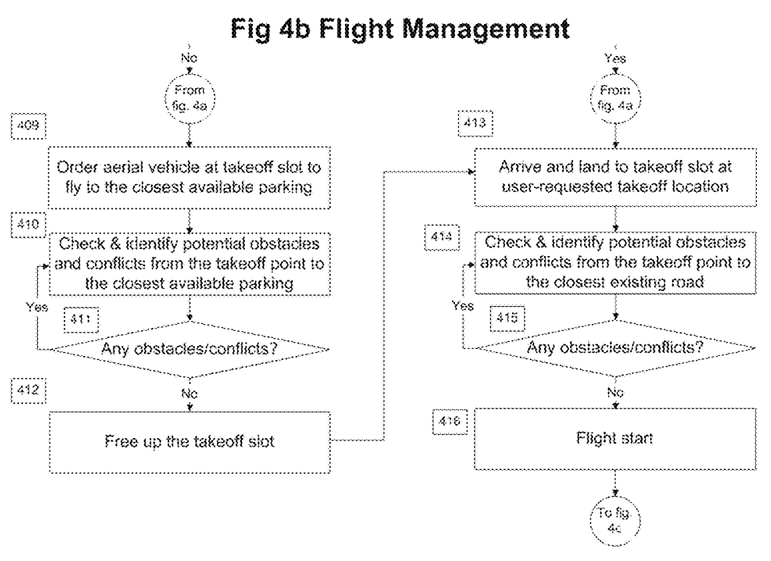
Figure 4C:
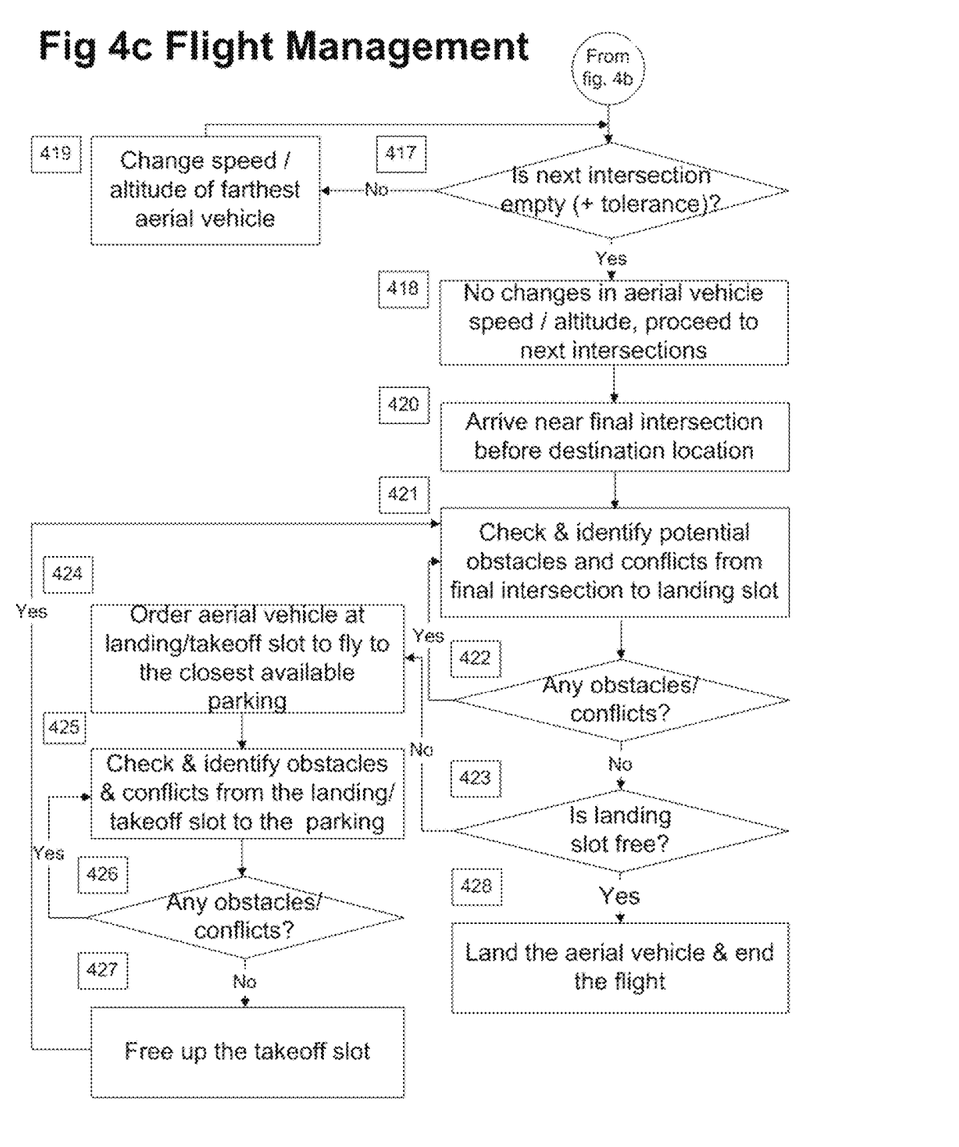

The invented system flight order management process is graphically illustrated in FIGS. 4*a*, 4*b* and 4*c*.

The invented system flight order management process comprises the following steps.

Receiving, from one of the system registered users, a flight request for an aerial vehicle 401, wherein the flight request comprises departure time, number of passengers/weight of goods, departure location and destination location.

Matching, on a central processing server unit, the flight request time, passengers/goods origin and destination data with closest available aerial vehicle 402.

Checking if the battery life of the chosen matched aerial vehicle is sufficient for the ordered flight 403. If battery life is insufficient for the ordered flight, the system orders to charge the battery of the said aerial vehicles 404, and then once again matches the ordered flight characteristics with the next available closest aerial vehicle.

If battery life is sufficient, on the next step 405, the system checks and identifies potential obstacles and conflicts from the chosen matched aerial vehicle current location to user-requested takeoff location.

If in the check 406, there are no obstacles and no conflicts, the aerial vehicle takes off and starts flight to user-defined takeoff location 407, according to safe XYZ coordinates calculated by the system.

On the next step 408, the system checks if the takeoff slot is available for landing or if it is taken by other aerial vehicles or otherwise not available. For facilitating that, in the system database, a number of landing/takeoff slots and their characteristics (such as a number of slots in a particular landing/takeoff slots location) will be inputted for each landing/takeoff location.

If the takeoff slot is taken by other aerial vehicle, the system will order the aerial vehicle occupying the said takeoff slot to fly to the closest available parking 409 (FIG. 4b).

On the next step 410, for the aerial vehicle evacuating the landing/takeoff slot, the system checks the path for its flight from the landing/takeoff slot to the closest available parking.

If in the check 411, there are no obstacles and no conflicts, the aerial vehicle takes off to free up the takeoff slot 412, according to safe XYZ coordinates calculated by the system, and flies to the abovementioned closest available parking 413. If check 411 determines any obstacles and/or conflicts on the path to the closest available parking, the system will perform step 410 again, until there are no obstacles and no conflicts, and the path is accordingly clear and safe.

On the next step 414, for the aerial vehicle before the takeoff, the system checks the path for its flight from the landing/takeoff slot to the aerial point above closest existing road (as described above, the aerial vehicles will fly above existing paved roads network).

If in the check 415, there are no obstacles and no conflicts, the aerial vehicle takes off and flies to the abovementioned existing road 416, according to safe XYZ coordinates calculated by the system. If check 415 determines any obstacles and/or conflicts on the path to the aerial point above the closest existing road, the system will perform step 414 again, until there are no obstacles and no conflicts and the path is accordingly clear and safe.

After getting to the aerial point above the closest existing road, the aerial vehicle will fly strictly above the existing roads from one existing road intersection to the next.

Continuing with the FIG. 4c, the system planning unit for planning the aerial vehicle routes will check before each intersection the path/paths of the aerial vehicles to make sure that they will not intersect, and that the time and distance difference between each pair of aerial vehicles at next intersection will be at least the same as the predetermined safety tolerance interval 417.

For that,

Safe tolerance time interval will be defined by $\delta$ sec.

Safety height interval will be defined by $\Delta H$.

System checks each intersection and the surrounding distance (in meters/second) which is defined as below:

$$V^{Max}/3.6 \cdot \delta$$

Speed limits were previously defined by $V^{Max}, V^{Min}$.

Speeds of aerial vehicle before the next intersection will be defined by:

$$V_{X1}, V_{X2}; V_{Y1}, V_{Y2};$$

Lengths of routes before the intersection will be $L_X, L_Y$ respectively;

Then expected time interval between of aerial vehicles at the intersection $$|L_X/V_X - L_Y/V_Y| = \Delta T$$

Denote safe tolerance time interval of $\delta$ sec by $$|L_X/V_X - L_Y/V_Y| > \delta$$

If expected time interval is bigger than safe tolerance time interval then current intersection is skipped without processing, else our model is applied to adjust the expected time interval.

So, if the distance difference between each pair of aerial vehicles at the aerial next intersection will be at least the same as the predetermined safety tolerance interval at the next intersection, then the aerial vehicle will receive an order to proceed on its path without change in speed/altitude 418. If not, the change of speed and/or altitude will be ordered to the aerial vehicle farthest to the intersection 419.

Let's define:

Speeds increments/decrements as decision variables $\Delta_X, \Delta_Y$;

We want to minimize total changes of speed of all aerial vehicles, so an objective to minimize is:

$$|\Delta_X| + |\Delta_Y|,$$

Constraints:

$$|L_X/(V_X + \Delta_X) - L_Y/(V_Y + \Delta_Y)| > \delta; \quad (1)$$

$$V^{Max} > V_X + \Delta_X > V^{Min} \quad (2)$$

$$V^{Max} > V_Y + \Delta_Y > V^{Min} \quad (3)$$

This problem is nonlinear due to absolute values of decision variables in the objective function and absolute value of the constraint (1) and decision variables in denominator.

However this nonlinear problem can be linearized in the following way: Let's introduce four nonnegative variables $$u_X, v_X, u_Y, v_Y \geq 0,$$

So that $$\Delta_X = u_X - v_X, \Delta_Y = u_Y - v_Y;$$

$$|\Delta_X| = u_X + v_X, |\Delta_Y| = u_Y + v_Y;$$

Therefore, the objective turns to linear sum of decision variables:

$$u_X + v_X + u_Y + u_Y \rightarrow \min;$$

The constraint $$\left| \frac{L_X}{V_X + u_X - v_X} - \frac{L_Y}{V_Y + u_Y - v_Y} \right| > \delta$$

Can be split to two linear problems:

$$\frac{L_X}{V_X + u_X - v_X} - \frac{L_Y}{V_Y + u_Y - v_Y} > \delta$$

or $$\frac{L_X}{V_X + u_X - v_X} - \frac{L_Y}{V_Y + u_Y - v_Y} < -\delta$$

Therefore two linear problems needed be solved:

$$u_X + v_X + u_Y + v_Y \rightarrow \min; \quad (*)$$

$$\frac{L_X}{V_X + u_X - v_X} - \frac{L_Y}{V_Y + u_Y - v_Y} > \delta$$

And $$u_X + v_X + u_Y + v_Y \rightarrow \min; \quad (**)$$

-continued $$\frac{L_X}{V_X + u_X - v_X} - \frac{L_Y}{V_Y + u_Y - v_Y} < -\delta$$

Let's transform (*) to strictly linear $$L_X V_Y + L_X(u_Y - v_Y) - L_Y V_X - L_Y(u_X - v_X) > \delta[V_X V_Y + V(u_Y - v_Y) + V_Y(u_X - v_X)],$$

Because denominators are positive;
The nonlinear member $$(u_X - v_X)(u_Y - v_Y) = \Delta_X \Delta_Y$$

neglected due to small value in comparison with other members;
Or with explicit coefficients and RHS:

$$u_X(\delta V_Y + L_Y) + u_Y(\delta V_X - L_X) - v_X(L_Y + \delta V_Y) + v_Y(L_X - \delta V_X) < L_X V_Y - L_Y V_X - \delta V_X V_Y,$$

Additional constraints should be added to model,
Denominators should be positive:

$$V_X + u_X - v_X > 0$$

And $V_Y \pm u_Y - v_Y > 0$

Or $$u_X - v_X < V_X$$

$$u_X - v_X > -V_X$$

And $$u_Y - v_Y > -V_Y$$

To keep inequality direction after multiplying by denominators
For (**) will have $$L_X V_Y + L_X u_Y - L_X v_Y - L_Y V_X - L_Y u_X + L_Y v_X < -\delta[V_X V_Y + V_X(u_Y - v_Y) + V_Y(u_X - v_X)],$$

Or with explicit coefficients and RHS (right-hand side):

$$u_X(\delta V_Y - L_Y) + u_Y(\delta V_X + L_X) + v_X(L_Y - \delta V_Y) - v_Y(L_X + \delta V_X) < -L_X V_Y - L_Y V_X - \delta V_X V_Y;$$

After both problems will be solved and two pairs of variables $\Delta_X$, $\Delta_Y$ are computed, we should choose the pair with minimal objective $|\Delta_X| + |\Delta_Y|$.

After passing the intersection, the speeds of both aerial vehicles will be returned to previous values with same accelerations (with opposite signs).

When two aerial vehicles are moving in the same direction and the second aerial vehicle is flying with higher speed, then to avoid collision, the second aerial vehicle will go half-level up to overtake the first aerial vehicle, and then the second aerial vehicle will return to its previous level.

When the aerial vehicle is before the final intersection before the destination location 420, the system will check the path for its flight from the said intersection to the landing slot point 421.

If check 422 determines any obstacles and/or conflicts on the path to the landing slot, the system will perform step 421 again, until there are no obstacles and no conflicts and the path is accordingly clear and safe.

If in the check 422, there are no obstacles and no conflicts, the system further checks if the landing/takeoff slot is free and available for landing 423.

If the landing/takeoff slot is taken by other aerial vehicle, the system will order the aerial vehicle occupying the said slot to fly to the closest available parking location 424.

On the next step 425, for the aerial vehicle evacuating the landing/takeoff slot, the system checks the path for its flight from the said slot to the closest available parking.

If in the check 426, there are no obstacles and no conflicts, the aerial vehicle occupying the landing/takeoff slot will takeoff to free up the said slot 427, according to safe coordinates calculated by the system, and will fly to the abovementioned closest available parking. If check 426 determines any obstacles and/or conflicts on the path to the closest available parking, the system will perform step 425 again, until there are no obstacles and no conflicts, and the path is accordingly clear and safe.

When the landing/takeoff slot will become free and available for landing, the system will perform steps 421-423 again, and if no obstacles/conflicts found, the system will order the aerial vehicle to land, and thus finish the ordered flight process 428.

When collision is expected to happen between two aerial vehicles flying on the same route because the back aerial vehicle is moving faster then to avoid collision the back aerial vehicle should go up half level and after overtaking the slow aerial vehicle for safety distance return in previous level.

Figure 5:
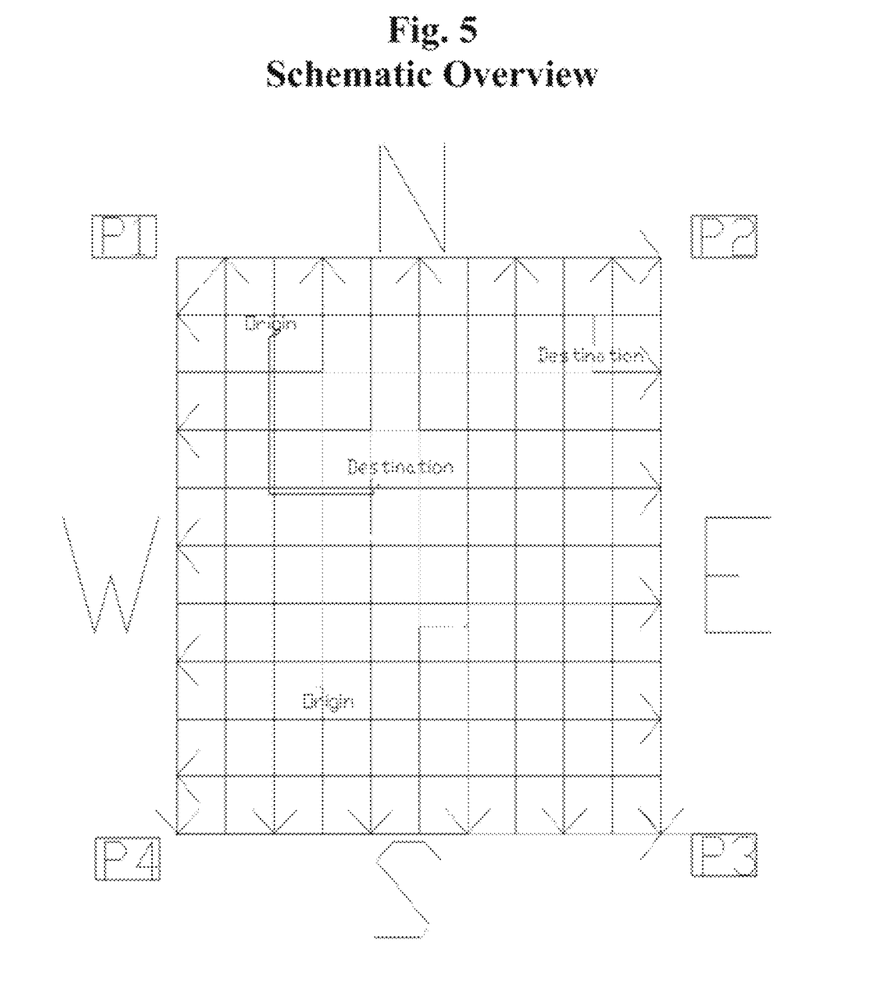
FIG. 5 provides a schematic example of the aerial vehicles movement in an urban environment.

FIG. 5 provides a schematic example of the aerial vehicles movement in an urban environment. As evident from the FIG. 5, aerial vehicles are moving in one specific direction (mentioned by arrows) above each existing road.

Origin and destination depict takeoff and landing points (those in most occasions will be not above/near the existing road).

P1 . . . P4 defines four different parking locations.

System

The invention further includes an automated centralized aerial vehicles traffic control in an urban environment for centrally maximizing and regulating aerial traffic capacity in an entire city, such a system providing safe path from takeoff to landing, wherein the aerial vehicles fly directly above existing roads while minimizing total number of changes in speed and altitude level for all aerial vehicles currently using the centralized urban environment aerospace, the system comprising:

a centralized processing server unit for each urban area traffic control zone aerospace, such a unit being programmed: to receive and store a data on the roads above which aerial vehicles flying is allowed; to receive and store a data on direction of aerial movement above the road, as all roads will be set as one-way roads; to receive and store a data; to receive and store a data on altitude flight levels at which aerial vehicles can fly to overtake another aerial vehicle to prevent collision, such levels for overtaking and emergency situation will be called half-levels; to receive and store a data on aerial vehicles allowed to fly within the said an urban area air traffic control zone; to receive and store a data on landing, takeoff and parking locations available to aerial vehicles; to receive and store a data on users allowed to order aerial vehicles within the said an urban area air traffic control zone; to receive and store a list of safety and regulatory requirements, as will be determined by FAA or other similar agency responsible for aerial vehicles safety; to receive and store, from one of the system registered users, a flight request for an aerial vehicle, wherein the flight request comprises departure time, number of passengers or weight of goods, departure location and destination location;

a plurality of aerial vehicles having one or more processors means, GPS or ADS-b unit means, an onboard flight guidance system, a sensor-based obstacle detection and collision prevention unit means programmed to identify possible collision threats, transmitter and receiver for bi-directional communications with the central processing server unit;

CPU control processing unit means for matching, on a central processing server unit, the flight request data with the closest available aerial vehicle and choosing the said closest available aerial vehicle to perform a flight requested by the user;

battery capacity tester means for checking if the battery life of the chosen closest available aerial vehicle is sufficient for the ordered flight;

battery charging means for charging the battery of the said vehicles if the battery life is unsufficient for the ordered flight, and matching the ordered flight characteristics with the next available closest aerial vehicle;

sensor means for identifying potential obstacles and potential collisions from the chosen matched aerial vehicle current location to user-requested takeoff location, and ordering the matched aerial vehicle to arrive to the user-defined takeoff location;

CPU control processing unit means for checking if the landing and takeoff slot is free for landing, and ordering the closest matched aerial vehicle to land when the said slot is free;

CPU control processing unit for ordering the aerial vehicle occupying the landing and takeoff slot to evacuate it by flying to the closest available parking location;

CPU control processing unit means for generating flight path for an aerial vehicle from the takeoff slot location to the aerial point above closest intersection;

means for flying along the generated flight path, directly above existing roads, sensor means for identifying potential obstacles and potential collisions on aerial vehicle path from takeoff to landing;

CPU control processing unit for checking before each intersection if the time and distance difference between any two aerial vehicles will be at least the same as the certain safety tolerance interval;

CPU control processing unit for ordering change of speed and/or altitude of the aerial vehicles by minimizing the total number of changes in speed and/or altitude level for all aerial vehicles currently flying in the centralized urban environment aerospace; means for ordering aerial vehicles to change its altitude to the next half-level to overtake the slower aerial vehicle and/or to prevent collision;

CPU control processing unit for ordering to the aerial vehicle to land;

a toggle for switching the system mode from automatic system to decision support system, and from decision support system to automatic system.

Device

Figure 6:
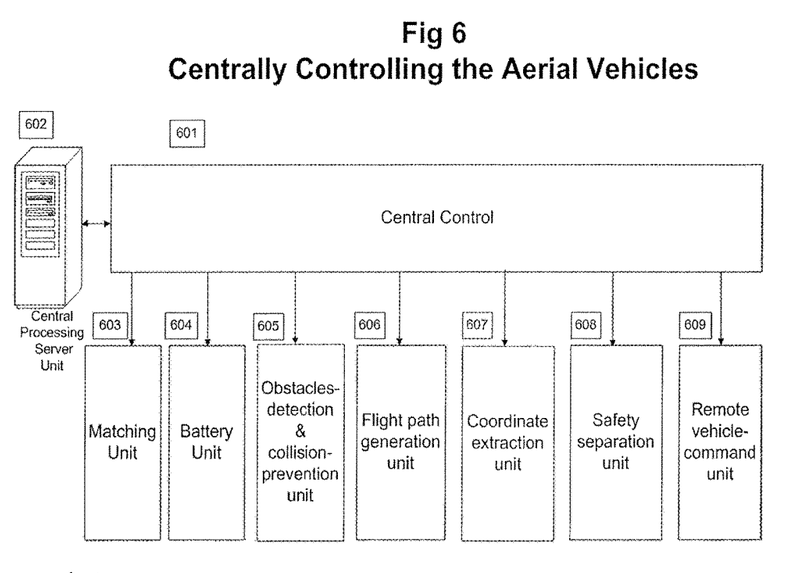
FIG. 6 schematically depicts centrally controlling the aerial vehicles in the invented system.

Further disclosed a device depicted in FIG. 6 for centrally controlling aerial vehicles movement in an urban area traffic control zone environment 601, the device comprising:

centralized processing server unit 602 in data communication with each of the plurality of the aerial vehicles within the urban space environment;

matching unit 603 that matches the flight request data with the closest available aerial vehicle;

battery unit 604 for checking battery life characteristics of the chosen closest available aerial vehicle and ordering to charge the battery, if necessary;

the obstacles-detection and collision-prevention unit 605 for identifying potential obstacles and potential collisions along the path of the aerial vehicle, such unit comprising location-defining unit and obstacles-detection unit;

flight path generation unit 606 for generating flight path for an aerial vehicle from the takeoff slot location to the landing/takeoff slot location;

coordinate extraction unit 607 that obtains aerial vehicles geographical coordinates using GPS or ADS-b;

safety separation determining unit 608 that checks aerial vehicle separation criteria and generates an alert if the distance between two or more aerial vehicles is or will be less than the predefined separation criteria;

a remote vehicle-command unit 609 to remotely change speed and/or altitude of an aerial vehicle to prevent obstacles and/or collisions.

Further Embodiments of the Invention

The architectures, processes, software and hardware presented above are not exclusive. Other software and hardware may also be derived in accordance with the principles of the invention to accomplish the same objectives.

In one embodiment of the invention, several private aerial vehicles operating companies (such as aerial taxis companies) will be granted a license to operate in a specific urban area air traffic control zone. In such an embodiment, all private companies will maintain their own list of landing/takeoffs slots, as well as parking locations, but they will need to transmit GPS/ADS-b location data to the centralized server unit to comply with the invented system safety regulations and requirements.

Those skilled in the art may implement modifications to the current design, without departing from the scope of the invention. Further, any of the functions provided by the system may be implemented in hardware, software or a combination of both.

What is claimed is:

1. A method for an automated centralized aerial vehicles traffic control in an urban environment for regulating aerial traffic capacity in an entire city, wherein the aerial vehicles fly directly above existing roads, such a system providing safe path from takeoff to landing, while minimizing total number of changes in speed and altitude level for all aerial vehicles currently using a centralized urban area traffic control zone aerospace, the method comprising the steps of:
   a. establishing a centralized processing server unit for each urban area air traffic control zone;
   b. determining and storing at the said server, a data on boundaries for each said urban area air traffic control zone, speed limits and the altitude flight levels within the said urban area;
   c. determining and storing at the said server, for every road in each of the said urban area air traffic control zones, if the road is available for flying above it;
   d. determining and storing at the said server, for each road determined as available for flying in step c., a direction of aerial movement above the road, as all roads will be set as one-way roads;
   e. determining and storing at the said server, for every road in each of the said urban area air traffic control zones, altitude flight levels at which aerial vehicles can fly to overtake another aerial vehicle to prevent collision or in emergency situation, following an order provided by the method, such levels for overtaking and emergency situation will be called half-levels;
   f. registering and storing at the said server, a complete list of aerial vehicles allowed to fly within each of the said urban area air traffic control zones, wherein each such aerial vehicle having GPS or ADS-b unit mounted on it to obtain an exact aerial vehicle location in predetermined time intervals;

g. determining and storing at the said server, a list of available landing-takeoff and parking slots for aerial vehicles from the step f., within the said urban area air traffic control zone;

h. registering and storing at the said server, a complete list of users allowed to order aerial vehicles within each of the said urban area air traffic control zones;

i. determining and storing at the said server, a list of safety and regulatory requirements, as will be determined by FAA or other similar agency responsible for aerial vehicles safety;

j. receiving, from one of the system registered users, a flight request for a flight on one of aerial vehicles registered in the system, wherein the flight request comprises departure time, number of passengers or weight of goods, departure location and destination location, and matching, on a central processing server unit, a flight request data with the closest available aerial vehicle;

k. checking if the battery life of the chosen closest available aerial vehicle is sufficient for the requested flight, and, if battery life is insufficient for the requested flight, ordering to charge the battery of the said closest aerial vehicles, and further matching the requested flight characteristics with a second closest available aerial vehicle;

l. checking and identifying potential obstacles and potential collision threats from a current location of an aerial vehicle matched in step j., to user-requested takeoff location, and if there are no obstacles and no potential collisions, ordering the matched aerial vehicle to arrive to a user-defined takeoff location;

m. checking if the landing-takeoff slot is free for landing at the user-defined takeoff location, and ordering the closest matched aerial vehicle to land when the said slot is free;

takeoff slot at the user-defined takeoff location is taken by another aerial vehicle, ordering an aerial vehicle occupying the said landing-takeoff slot to evacuate it and to fly to the closest available parking slot, when there are no obstacles and no conflicts on its path to the said closest available parking slot;

o. generating flight path for a previously matched aerial vehicle, such flight plan consists of the three following major flight phases:

from the landing-takeoff slot location to an aerial point above closest intersection, such intersection is called first intersection point, and is situated above an intersection of an existing road;

directly above existing roads on the altitude levels as determined in step b, along flight waypoints situated above existing roads intersections, from the first intersection point to a final intersection point before a user-defined destination location;

from the final destination point location to the landing-takeoff slot at landing location;

p. before the takeoff of the matched aerial vehicle from its landing-takeoff slot at takeoff location, checking and identifying potential obstacles and potential collisions on its path from the said landing-takeoff slot at takeoff location to an aerial point above closest existing road, and ordering the matched aerial vehicle to fly to the said aerial point above closest existing road when there are no obstacles and no potential collisions;

q. after getting to the said aerial point above closest existing road, ordering the matched aerial vehicle to fly strictly above the existing roads from one existing road intersection to the next on the altitude levels determined in step b;

r. checking before each intersection on the path of the said matched aerial vehicle that a time difference and a distance difference between it and any other aerial vehicle at the next intersection is no less than the certain safety tolerance interval as predetermined individually in each urban environment aerospace, and ordering the matched aerial vehicle to proceed on its path without change in speed or altitude, if there is no other aerial vehicle expected at the intersection, or if the difference between at least two aerial vehicles is more than the said safety tolerance interval;

s. ordering an aerial vehicle farthest from the intersection to change the speed and/or altitude, if the difference between at least two aerial vehicles is less than the said safety tolerance interval, such changes of speed and/or altitude will be made by taking into consideration all other aerial vehicles moving throughout the centralized urban environment aerospace by minimizing with minimal total number of changes in speed and/or altitude level for all aerial vehicles currently using the said aerospace;

t. when two aerial vehicles are moving in the same direction and the second aerial vehicle is flying with higher speed, then, to avoid collision, ordering the second aerial vehicle to change its altitude to the next half-level to overtake the first aerial vehicle, and to return to its previous altitude such overtaking;

u. before arriving to the final intersection point before the landing, checking and identifying potential obstacles and potential collisions on its path from the final intersection point to the landing-takeoff slot at landing location, and ordering the matched aerial vehicle to land, when there are no obstacles and no potential collisions and if the landing-takeoff slot at the landing location is free from other aerial vehicles;

w. if the landing-takeoff slot at the landing location is occupied by another aerial vehicle, ordering an aerial vehicle occupying the said slot to fly to the closest available parking slot, when there are no obstacles and no conflicts on its path to the said closest available parking slot.

2. The method of claim 1, wherein the landing-takeoff location slots can be either on the roofs of existing buildings or on the grounds.

3. The method of claim 1, wherein the parking slot locations can be either on roofs of existing buildings or on the grounds.

4. The method of claim 1, wherein one or several aerial vehicles' operating companies can operate within the centralized urban environment aerospace, wherein all aerial vehicles' operating companies will transmit their aerial vehicles information and location data to the centralized processing server unit.

5. The method of claim 1, wherein the aerial vehicles can be either manned or unmanned.

6. The method of claim 1, wherein the method can be operated either as a completely automated method or a decision-support method supporting human urban area air traffic control zone controllers.

7. The method of claim 1, wherein urban area air traffic control zone is a city, a town or a group of cities connected by common network of roads.

8. A system for an automated centralized aerial vehicles traffic control in an urban environment for regulating aerial traffic capacity in an entire city, such a system providing safe path from takeoff to landing, wherein the aerial vehicles fly directly above existing roads while minimizing total number of changes in speed and altitude level for all aerial vehicles currently using a centralized urban area air traffic control zone aerospace, the system comprising:

a centralized processing server unit for each urban area air traffic control zone aerospace, such a unit being programmed: to receive and store a data on the roads above which aerial vehicles flying is allowed; to receive and store a data on direction of aerial movement above the road, as all roads will be set as one-way roads; to receive and store a data; to receive and store a data on altitude flight levels at which aerial vehicles can fly to overtake another aerial vehicle to prevent collision, such levels for overtaking and emergency situation will be called half-levels; to receive and store a data on aerial vehicles allowed to fly within the said urban environment aerospace air traffic control zone; to receive and store a data on landing, takeoff and parking locations available to aerial vehicles; to receive and store a data on users allowed to order aerial vehicles within the said urban environment aerospace air traffic control zone; to receive and store a list of safety and regulatory requirements, as will be determined by FAA or other similar agency responsible for aerial vehicles safety; to receive and store, from one of the system registered users, a flight request for an aerial vehicle, wherein the flight request comprises departure time, number of passengers or weight of goods, departure location and destination location;

a plurality of aerial vehicles having one or more processors means, GPS or ADS-b unit means, an onboard flight guidance system, a sensor-based obstacle detection and collision prevention means programmed to identify possible collision threats, transmitter and receiver for bi-directional communications with the central processing server unit;

CPU control processing unit for matching, on a central processing server unit, a flight request data with a closest available aerial vehicle and choosing the said closest available aerial vehicle to perform a flight requested by the user;

battery capacity tester means for checking if the battery life of the chosen closest available aerial vehicle is sufficient for the requested flight;

battery charging means for charging the battery of the said vehicles if the battery life is insufficient for the requested flight, and matching the requested flight characteristics with the next available closest aerial vehicle with the sufficient battery life for the requested flight;

sensor means for identifying potential obstacles and potential collisions along the path from a current location of an aerial vehicle matched by CPU control processing unit to user-requested takeoff location, and ordering the matched aerial vehicle to arrive to a user-defined takeoff location;

CPU control processing unit for checking if the landing-takeoff slot at the user-defined takeoff location is free for landing, and ordering the closest matched aerial vehicle to land when the said slot is free for landing;

CPU control processing unit for ordering an aerial vehicle occupying a landing-takeoff slot at the user-defined takeoff location to evacuate it by flying to the closest available parking slot location;

CPU control processing unit for generating flight path for an aerial vehicle from the landing-takeoff slot location at the user-defined takeoff location to an aerial point above closest intersection;

means for flying along the generated flight path, directly above existing roads, sensor means for identifying potential obstacles and potential collisions on aerial vehicle path from takeoff to landing;

CPU control processing unit for checking before each intersection if a time difference and a distance difference between any two aerial vehicles will be at least the same as a predetermined safety tolerance interval;

CPU control processing unit for ordering change of speed and/or altitude of the aerial vehicles, while minimizing the total number of changes in speed and/or altitude level for all aerial vehicles currently flying in the centralized urban environment aerospace;

CPU control processing unit for ordering aerial vehicles to change its altitude to the next half-level to overtake the slower aerial vehicle and/or to prevent collision;

CPU control processing unit for ordering to an aerial vehicle to land.

9. A system of claim 8 further comprising a toggle for switching the system mode from automatic system to decision support system, and from decision support system to automatic system.

10. A device for centrally controlling aerial vehicles movement in an urban area air traffic control zone aerospace, the device comprising:

matching unit that matches a flight request data with a closest available aerial vehicle;

battery unit for checking battery life characteristics of a previously matched aerial vehicle and ordering to charge the battery, if necessary;

obstacles-detection and collision-prevention unit for identifying potential obstacles and potential collisions along the path of a previously matched aerial vehicle, such unit comprising location-defining unit and obstacles-detection unit;

flight path generation unit for generating flight path for a previously matched aerial vehicle from Abe landing-takeoff slot at takeoff location to a landing-takeoff slot at landing location;

coordinate extraction unit that obtains aerial vehicles geographical coordinates using GPS or ADS-b;

safety separation unit that checks aerial vehicle separation criteria and generates an alert if the distance between two or more aerial vehicles is or will be less than a predefined separation criteria;

a remote vehicle-command unit to remotely change speed and/or altitude of a previously matched aerial vehicle to prevent obstacles and/or collisions;

centralized processing server unit in data communication with each of the aerial vehicles within the urban area air traffic control zone aerospace.

* * * * *